United States Patent [19]

Herbert et al.

[11] Patent Number: 5,152,723
[45] Date of Patent: Oct. 6, 1992

[54] ENDLESS METAL BELT ASSEMBLY WITH HARDENED BELT SURFACES

[75] Inventors: William G. Herbert; Mark S. Thomas, both of Williamson, N.Y.

[73] Assignee: Xerox Corporation, Stamford, Conn.

[21] Appl. No.: 633,025

[22] Filed: Dec. 24, 1990

[51] Int. Cl.⁵ .................................................. F16G 1/20
[52] U.S. Cl. .................................... 474/272; 205/73; 205/77; 205/138; 205/142; 205/243; 205/255
[58] Field of Search ............... 474/242, 244, 259–260, 474/270, 272, 237, 201; 156/137; 29/DIG. 73, DIG. 99; 204/3–4, 9, 26, 40–42, 43.1, 281; 205/73, 77, 138, 142, 243, 255

[56] References Cited

U.S. PATENT DOCUMENTS

| | | | |
|---|---|---|---|
| 2,569,367 | 9/1951 | Bradner et al. | 204/3 X |
| 3,604,283 | 9/1971 | Van Doorne | 74/233 X |
| 3,799,859 | 3/1974 | Wallin | 204/216 |
| 3,844,906 | 11/1974 | Bailey et al. | 204/9 |
| 3,922,044 | 11/1975 | Bucalo | 204/9 X |
| 3,950,839 | 4/1976 | Dupree et al. | 204/25 X |
| 3,954,568 | 5/1976 | Dupree | 204/9 |
| 3,959,109 | 5/1976 | Hambling et al. | 204/212 |
| 3,963,587 | 6/1976 | Kreckel | 204/4 X |
| 3,970,527 | 7/1976 | Brown | 204/9 |
| 4,067,782 | 1/1978 | Bailey et al. | 204/25 |
| 4,326,928 | 4/1982 | Dugan | 204/9 |
| 4,501,646 | 2/1985 | Herbert | 204/4 |
| 4,530,739 | 7/1985 | Hanak et al. | 204/4 |
| 4,579,549 | 4/1986 | Okawa | 474/242 |
| 4,640,758 | 2/1987 | Held | 204/272 |
| 4,650,442 | 3/1987 | Parsons | 474/29 |
| 4,661,089 | 4/1987 | Cuypers | 474/242 |
| 4,664,758 | 5/1987 | Grey | 204/3 |
| 4,787,961 | 11/1988 | Rush | 204/9 |
| 4,902,386 | 2/1990 | Herbert et al. | 204/9 |

OTHER PUBLICATIONS

Baumeister, T. and Marks, L. S. Standard Handbook for Mechanical Engineers, 7th Ed. pp. 5-15 to 5-17.
Keeton, C. R., *Metals Handbook*, 9th Edition, "Ring Rolling", pp. 108-127.

*Primary Examiner*—Ramon S. Britts
*Assistant Examiner*—Roger J. Schoeppel
*Attorney, Agent, or Firm*—Oliff & Berridge

[57] ABSTRACT

In a multilayer endless metal belt assembly, adjacent opposing belt surfaces have different hardnesses so that they may be lubricous and less subject to galling.

29 Claims, 1 Drawing Sheet

ENDLESS METAL BELT ASSEMBLY WITH HARDENED BELT SURFACES

BACKGROUND OF THE INVENTION

This invention relates in general to endless metal belts, and in particular to a multilayer endless metal belt assembly which has hardened belt surfaces to prevent galling, and to improve lubrication and wear resistance.

Endless metal belts are known for many purposes, including their use in a nested assembly as drive members for continuously variable transmissions. When used in this manner, an endless metal belt assembly must have certain properties and characteristics to operate efficiently.

An endless metal belt assembly must be constructed of a material which is strong, exhibiting both a high fatigue strength which reduces the likelihood of failure from fatigue fracturing, and high compressive strength and tensile strength, which enables the belt to withstand the demands imposed by the bending stresses inherent in the operation of the dual pulley system of a continuously-variable transmission. The belt material must stretch without yielding and be flexible. It must be durable and exhibit high wear resistance, because replacement is costly and requires that the transmission be non-functional. The belt material must have high processability, and be capable of being fashioned into a very thin layer which can be manufactured to a high precision of circumferential length. In the event of multiple metal belts forming the continuously-variable transmission belt assembly, this high precision of circumferential length for each successive belt is especially critical to the formation of equal gaps between each successive belt of the assembly. There must be minimal friction between belts; thus, the surfaces of the belts must be designed to maintain a lubricated state within the spaces between the belts. Each belt of a multilayered belt assembly must be capable of equal load sharing.

U.S. Pat. No. 3,604,283 to Van Doorne discloses a flexible endless member consisting of one or more layers of steel belts for use with a continuously-variable transmission containing a driving mechanism which comprises a driving pulley with a V-shaped circumferential groove and a driven pulley with a V-shaped circumferential groove. The flexible endless member, which has chamfered (beveled) flanks, interconnects and spans the pulleys. The diameters of the pulleys automatically and steplessly can be varied with regard to each other in such a way that different transmission ratios can be obtained.

U.S. Pat. No. 4,661,089 to Cuypers discloses an endless metal belt for use with a continuously-variable transmission which is strengthened by the incorporation of permanent compressive stresses in the belt's edge zones to reduce the stresses in the edge zones, in particular the tensile stresses caused by the bending stress. The strain on the belt is thereby reduced, and the likelihood of belt breakage caused by hairline cracks occurring from the edges is decreased.

Endless metal belts used for belt drives can be formed by several methods. One manufacturing method disclosed in *Metals Handbook*, 9th ed., employs a "ring rolling method" wherein a metal, cylindrical tube is cut to a specified length and then an innermost belt is formed on the ring-rolling machine, making the ring wall thinner and the circumferential length longer. Subsequently, a number of additional belts, each with a diameter slightly larger than the diameter of the previously formed belt, may be similarly formed. The belts are then submitted to solution annealing in a vacuum furnace on a stainless steel cylinder, wherein the layered belts are rotated around two pulleys with tension applied in order to adjust the gap between the belts. After the dimensional correction, the layered belt is processed by precipitation-hardening (e.g., 490° C. for 3 hours) and surface-nitriding. Finally, in order to improve lubrication ability between belts, surface profiling is performed, by techniques such as peening, knurling, or preferentially heating or annealing a portion of the surface.

U.S. Pat. No. 4,787,961 to Rush discloses another method of preparing a multilayered endless metal belt. A tensile band set is formed from a plurality of separate looped endless bands in a nested and superimposed relation. The patent states that the bands are free to move relative to each other, even though the spacing between the adjacent bands is relatively small. Such bands may be formed by electroforming at least one band of the bandset.

U.S. Pat. No. 4,067,782 to Bailey et al. discloses a process for preparing endless metal belts intended for use with xerographic machines. An electroforming process employing a core mandrel suitable for chromium plating is used. The core is initially plated with nickel, and then an optional finishing step provides for subjecting the core to an acid dip bath and then plating the core with chromium.

When an endless metal belt assembly is used with a continuously-variable transmission, it experiences frictional stress between belts. In most applications, each belt in a multilayered endless metal belt assembly used with a continuously-variable transmission is moving progressively faster than the next successive inside belt. This type of movement tends to increase the surface area of the adjacent metal belts in contact with each other, producing frictional stress. Therefore, it is desirable to have belts which are flexible, with a lubricous, hard surface.

SUMMARY OF THE INVENTION

It is an object of the invention to increase the lubricity of the belts of an endless metal belt assembly.

It is another object of the invention to decrease frictional stress between adjacent belts.

It is still another object of the invention to provide an improved electroforming process of forming an endless metal belt assembly.

To achieve these and other objects and to overcome the problems of the prior art, the present invention provides an endless metal belt assembly, and a process for forming the belts of the assembly, wherein selected surfaces of the belts are formed of materials of different hardness to increase the lubricity of the surfaces and decrease frictional stress between adjacent belts.

DETAILED DESCRIPTION OF PREFERRED EMBODIMENTS

Figure 1:
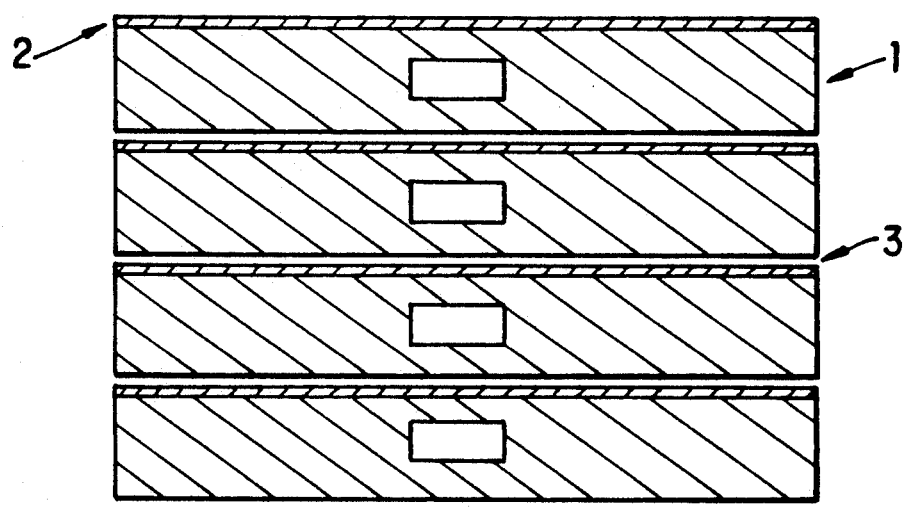
FIG. 1 illustrates an endless metal belt assembly of four nickel belts with a thin layer of chromium plated on their outer surface.

This invention provides for a flexible belt assembly with at least two metal belts superimposed on each other in such a manner that adjacent surfaces are separated by only a small gap. Adjacent belt surfaces are comprised of different metals of varying hardness, which increases the lubricity between the surfaces and decreases the tendency of the belts to gall.

In the present invention, a multilayer endless metal belt assembly is formed by any of the methods commonly known in the art. At least two, and up to 40 or more, belts comprising the endless metal belt assembly are formed in such a manner that they comprise a "nest" of belts. Going outward from the center belt, each belt is successively larger than the preceding inner belt, and all belts are superimposed on one another. In this configuration, the opposing inner and outer surfaces of each pair of adjacent belts are separated by only a small gap, ranging from about 0.000254 to about 0.0762 mm, preferably 0.00762 to 0.0127 mm. The adjacent belt surfaces are the source of frictional stress during the use of the endless metal belt assembly as, for example, a driving member for a dual pulley system. Opposing surfaces move independently in the operation of the endless metal belts. Often, the relative movement is in opposite directions circumferentially, and may also be in opposite directions laterally.

The endless metal belt assembly of this invention is comprised of a series of superimposed metal belts, each of which is comprised of a single metal or metal alloy, or of different metals or metal alloys fused together. In the fused state, different metals or alloys are preferably used for the inner and outer surface layers of a belt. Metals and alloys which may be used to form these belts and/or layers include nickel, chromium, copper, cobalt, iron, tin, gold, silver, platinum, lead, palladium and the like, and alloys thereof. Preferably, nickel, chromium, and cobalt are employed. Where the term "metal" is used herein, it should be construed as including a metal alloy unless otherwise specified.

According to this invention the hardness of each surface (i.e., radially inner and outer) of the metal belts is different from the hardness of the adjacent opposing surface. Therefore, when assembling the belts, they are configured so that adjacent opposing belt surfaces are of different hardness. In the simplest configuration, this can be accomplished by having each inner surface composed of a metal of a given characteristic hardness, and having each outer surface composed of a metal of a different characteristic hardness.

Each successive belt can be entirely composed of a different metal; e.g., a solid nickel belt adjacent to a solid cobalt belt. For example, in a belt assembly comprised of three endless metal belts, the innermost and outermost belts may be comprised of the same metal, and therefore of the same hardness, and the middle belt may be comprised of another metal of different hardness. Additional belts may continue to alternate these two metals, thereby ensuring that each surface will be adjacent a surface comprised of a metal of different hardness.

FIG. 1 illustrates an endless metal belt assembly within the scope of the present application. The belt assembly comprises four nickel belts 1 with the outer surface of each belt electroplated with a layer of chromium 2. Each belt is separated by a gap 3 which may hold a lubricant.

In more complex configurations, more than two different metals may be used to prepare the metal belts, with the configuration options increasing geometrically with each additional metal used. For example, each belt of an endless metal belt assembly may be comprised of a different metal from the metal forming the other belts, and have a different hardness. In the event of more than three layers forming the endless metal belt assembly, a broad range of combinations is possible of different metals, with the proviso that no adjacent surfaces are comprised of metals of the same hardness.

The hardness of thin (0.0000254 to 0.1250000 mm) layers is difficult to measure accurately. Conventional hardness measuring techniques which give accurate results often require samples of thickness which exceed 0.125 mm. Accurate hardness measurements can be made on highly polished cross sectioned thinner layers (down to a thickness of about 0.00254 mm) using a technique wherein small loads (0 to 10 grams) are used to make indentations in the thin layer. A Wilson® Tukon® Microhardness Tester model LR modified so that loads of less than 25 grams can be used is preferably used to measure the hardness of belts of this invention. The term "microhardness testing", as used in the United States, refers to the method of testing specimen areas and thicknesses which are too small to accommodate the areas and depths of indents produced by other types of hardness testers. A more accurate term to use than "microhardness" would be "microindentation", because, in reality, this type of hardness testing utilizes minute indentations, whereas the hardness values are not necessarily small.

The Vickers scale for measuring hardness may be used as appropriate. The Vickers hardness number is the applied load divided by the surface area of the indentation. The depth of the Vickers indentation is about one seventh of the diagonal length. The hardness of individual belts of the invention when measured on the Vickers scale is not critical, but is preferably from about 250 DPH V 25 g to about 1100 DPH V 25 g. (DPH V 25 g is diamond pyramid hardness measured with a 25 g load.) The hardness of chromium ranges from 750 to 1100 DPH V 25 g. The hardness of nickel may range from 100 to 650 DPH V 25 g, and more likely from 250 to 410 DPH V 25 g. The hardness of cobalt ranges from 120 to 670 DPH V 25 g. The preferred difference in hardness between the belts of this invention is at least about 100 DPH V 25 g, and may range from 100 to about 800 DPH V 25 g, more preferably, from 150 to about 750 DPH V 25 g, and most preferably from 200 to about 600 DPH V 25 g.

While any method of forming an endless metal belt can be used for this invention, the preferred method is an electroforming process. Appropriate processes are similar to those disclosed in U.S. Pat. Nos. 3,844,906 and 4,501,646.

To prepare an endless metal belt by such methods, an electroforming zone between an anode selected from a metal and alloys thereof and a cathode comprising the core mandrel is formed, the cathode and anode being separated by a bath comprising a salt solution of the metal or alloys thereof.

Any suitable metal capable of being deposited by electroforming and having a coefficient of expansion of between $6 \times 10^{-6}$ in/in/°F. and $10 \times 10^{-6}$ in/in/°F. may be used in the process of this invention. Preferably the electroformed metal has a ductility of at least about 1% elongation. Typical metals that may be electroformed include nickel, chromium, copper, cobalt, iron, tin, gold, silver, platinum, lead, palladium, and the like, and alloys thereof.

The core mandrel should be solid and of large mass to prevent cooling of the mandrel while the deposited coating is cooled. Further, the core mandrel should exhibit low thermal conductivity to maximize the difference in temperature between the electroformed article and the core mandrel during rapid cooling of the electroformed article to prevent any significant cooling and contraction of the core mandrel.

Typical mandrels include stainless steel, iron plated with chromium or nickel, nickel, titanium, aluminum plated with chromium or nickel, titanium palladium alloys, nickel-copper alloys such as Inconel 600 and Invar (both available from Inco), and the like. The outer surface of the mandrel should be passive, i.e., abhesive, relative to the metal that is electrodeposited, to reduce adhesion during electroforming. The cross-section of the mandrel may be of any suitable shape. The surface of the mandrel should be substantially parallel to the axis of the mandrel.

The bath and cathode are heated to a temperature sufficient to expand the cross-sectional area of the mandrel. The core mandrel is introduced into the bath, and a current is applied across the cathode and the anode to electroform a coating of the metal on the core mandrel until the desired thickness is achieved.

According to one embodiment of the present invention, an endless metal belt assembly is formed by an electroforming process similar to those disclosed in U.S. Pat. No. 3,844,906 to Bailey and U.S. Pat. No. 4,501,646 to Herbert. This process provides an electroforming bath formulated to produce a thin, seamless metal belt by electrolytically depositing metal from the bath onto a support mandrel. Electroformed belts may be formed individually, or in a superimposed manner, to form a "nested" belt assembly. When produced as an assembly, each belt within the assembly is separated from the adjacent belt or belts by a gap which contains a lubricant.

An advantage of the electroforming process is that it enables very thin belts to be formed in a manner that controls the gap size optimally. The optimal thickness of the belt material is identified by determining the belt thickness associated with the lowest total stress (bending stress plus direct stress) on the belt in a given dual pulley system. The total stress is equal to the sum of the bending stress plus the direct stress. Bending stress is equal to $EC/\rho$, wherein E is the elasticity of the belt material, C is one half the belt thickness, and $\rho$ is the radius of curvature of the smallest pulley. Direct stress is equal to $F_1/A$, wherein $F_1$ is the tight side force between the pulleys and A is the cross-sectional area of the belt. The total stress is calculated for a series of belts of different thicknesses, and the belts are formed with the thickness which has the lowest total stress value.

The optimal gap size is the minimum gap necessary to provide adequate lubrication, since a smaller gap allows the lubricant to carry more torque than does a larger gap. This size can readily be determined by those of skill in the art. The optimal lubricant is identified by determining the lubricant with the highest torque-carrying ability within its optimal gap. The torque carrying ability of a given lubricant is equal to $$T = 4\mu\pi^2 Nr^3 l/M_r$$

wherein $\mu$ is the absolute viscosity of the lubricant, N is the rotational velocity of the smallest pulley, r is the radius of the smallest pulley, l is the width of the belt and $M_r$ is the radial clearance (gap) between adjacent belts. The torque carrying ability is calculated for a series of different lubricants and a lubricant is selected which provides the highest value. The methods of determining optimal belt thickness and lubricant are disclosed in detail in U.S. Pat. No. 5,049,242 and entitled "Endless Metal Belt Assembly with Controlled Parameters", which is hereby incorporated by reference.

The gap which is formed between adjacent layers may be controlled by selecting those parameters which produce a compressive stress which will produce the desired gap, such as electroforming bath temperature, current density, agitation and stress reducer concentration, as disclosed in detail in copending application Ser. No. 07/632,518, filed simultaneously herewith and entitled "Electroforming Process for Endless Metal Belt Assembly with Belts that are Increasingly Compressively Stressed," which is hereby incorporated by reference.

A first metal belt is formed, and then removed from the electroforming bath and rinsed. The removal and rinsing terminates the electroforming process for that belt and removes any impurities remaining on the surface of the belt. The second step comprises forming an electroforming solution with ions of a metal of different hardness in the electroforming bath, placing the electroformed metal belt into the second electroforming bath and applying a current as above. This provides for a second metal to be deposited on the first belt in such a manner that the two belts are fused together. These two layers together form a single belt, and act as a single discrete unit during the use and operation of the endless metal belt.

Belts formed by the electroforming process may have the belt edges strengthened so that the ductility of the edge regions of the belt is made greater than that of the center region, for instance by annealing the edges, as disclosed in detail in copending application Ser. No. 06/633,027 filed simultaneously herewith and entitled "Endless Metal Belt with Strengthened Edges," which is hereby incorporated by reference.

The belts may be further improved by electroforming the belts with surfaces designed to trap and circulate lubricant with protuberances, indentations, and pits formed by adjusting parameters of the electroforming bath such as the mandrel surface roughness, metal ion concentration, rate of current application, current density and operating temperature of the electrolyte. The protuberances thus formed, for example, may be up to about 95% of the gap size. Electroformed belts with such surfaces are disclosed in copending application Ser. No. 07/633,604 filed simultaneously herewith and entitled "Endless Metal Belt Assembly with Minimized Contact Friction," which is hereby incorporated by reference.

In a preferred embodiment, an endless metal belt comprised of nickel is formed by an electroforming process. After this belt is formed, the mandrel with the endless metal belt is removed from the nickel electrolyte bath and rinsed with at least 0.1 million ohm-cm (measured at 25° C.) demineralized water which is essentially free of colloids, organics, particulate matter, bacteria, pyrogens, and un-ionized compounds.

In a preferred rinsing procedure, the mandrel with the endless metal belt is rinsed with 1 million ohm-cm (measured at 25° C.) demineralized water which is essentially free of colloids, organics, particulate matter, bacteria, pyrogens, and un-ionized compounds, at a temperature which is within 2° C. of the subsequent plating bath, and at a rate of 1 to 10 L/min while rotating at 100 to 10,000 linear cm/min. This rinse starts within 2 minutes after clearing the surface of the nickel electrolyte and lasts until 45 seconds before total immersion into a chromium plating bath.

In a more preferred rinsing procedure, the mandrel with the endless metal belt is rinsed with 2 million ohmcm (measured at 25° C.) demineralized water which is essentially free of colloids, organics, particulate matter, bacteria, pyrogens, and un-ionized compounds, at a temperature which is within 0.5° C. of the nickel electrolyte and the chromium plating bath, and at a rate of 1 to 5 L/min delivered via a ring manifold affixed with spray nozzles sufficiently close together to guarantee total coverage and located 4 cm circumferentially and 2 cm above the electroformed member. The rinse is initiated after the top of the electroformed member clears the nickel electrolyte by 1 to 4 cm and is terminated when the top of the electroformed member is 6 to 10 cm above the surface of the chromium plating bath.

The belt is then provided with a coating of chromium in accordance with the following procedure. Prior to chromium coating the endless metal belt, the mandrel with the endless metal belt is rinsed with an excellent grade of demineralized water to remove the nickel electrolyte. Preferably, this rinse is done in a manner which keeps the mandrel with the endless metal belt at or near the plating temperature and also keeps the endless metal belt wet while transferring the mandrel with the endless metal belt from the nickel electrolyte to the chromium electrolyte.

Preferably, prior to immersing the mandrel with the endless metal belt in the chromium bath, a preliminary step of a "pre-electrolyze" or "dummy bath" is completed, which is performed to achieve uniform conductivity and activity of the anodes while reducing the concentration of $Cr^{+3}$ by transforming it to $Cr^{+6}$. Failure to perform this step may result in unacceptable deposits, especially after extended periods of bath inactivity (e.g., over a weekend). The inactivity of the anodes which occurs during an extended period of downtime usually results in films of lead chromates forming on these anodes. The dummy bath may comprise a pre-cathode of lead which is placed in a chromium bath of the composition described below. The anode to cathode surface area ratio is at least 24 to 1 and the cathode used during this pre-working step stays in the bath for at least 15 minutes with a current density of at least 20 amperes per square decimeter. The pre-cathode is removed from the chromium bath prior to the mandrel with the endless metal belt entering the chromium bath.

A chromium electroforming zone is established with a metal anode which may be selected from the group consisting of lead or lead alloys, preferably a lead alloy such as a lead/tin alloy, or lead/antimony alloy. The cathode may comprise the mandrel with the endless metal belt member. The preferred surface ratio of the anode to mandrel with the endless metal belt member cathode is at least about 1 to 1. The anode and the mandrel with the endless metal belt member cathode are separated by the chromium bath, which is maintained at a temperature of within 1° to 2° C. of the nickel electroforming bath when possible while staying between a temperature of 43° and 60° C. The preferred temperature is between 54° and 60° C. The endless metal belt member cathode enters the chromium bath, and a current density of from 7.8 to 62.4 amperes per square decimeter is applied to the bath for sufficient time to deposit at least 0.00127 mm of chromium on the endless metal belt. In the preferred procedure, the mandrel with the endless metal belt member cathode enters the chromium bath and is rotated at 4 to 6 rpm, and a current density of 15.6 amperes per square decimeter is applied.

Sufficient agitation should be imparted to the chromium bath to continuously expose the mandrel with the endless metal belt member cathode to fresh bath while maintaining the bath within the chromium plating zone at a stable equilibrium composition comprising:

| | |
|---|---|
| $CrO_3$ | 150–195 g/L |
| $SO_4^=$ | 1.2–1.5 g/L |
| $F^-$ | 0.6–0.8 g/L |
| $Cr^{+3}$ | 0–3.5 g/L (zero is preferred) |

The cathode is removed from the chromium bath solution after the current density is reduced to zero. The chromium plated endless metal belt with the mandrel is then rinsed to remove the chromium electrolyte carried out of the bath remaining from the surfaces of the cathode, as well as the chromium electrolyte on the rest of the cathode which resulted from the mist evolved during chromium deposition. The cathode is rinsed with a good grade of demineralized water (at least 0.05 million ohm-cm measured at 25° C.) at a rate of 2 to 10 L/min while being rotated over the chromium plating system at 4 to 10 rpm until all traces of chromium electrolyte are removed (at least six complete revolutions). It is preferred that this rinse is performed using the aforementioned excellent quality of demineralized water.

When an additional endless metal belt is to be deposited over the chromium plated endless nickel belt, a preferred rinse method would use an excellent quality of demineralized water at or near the electrolyte temperature of the subsequent nickel electroforming bath. Additionally, it is preferable to keep the cathode at or near the electrolyte temperature of the subsequent nickel electroforming bath until it is submerged in that bath. The preferred and more preferred methods used in rinse the belt between the first nickel bath and the chromium bath are also preferred and more preferred here. Because the chromium forms an oxide layer immediately upon exposure to air, the nickel will not adhere to the chromium. This process of forming a passive coating, such as an oxide film, between belts is disclosed in detail in U.S. Pat. No. 5,049,243 and entitled "Electroforming Process for Multilayer Endless Metal Belt Assembly," which is hereby incorporated by reference. The electroforming process is repeated to form the remaining belts of the metal belt assembly.

This invention will further be illustrated in the following, non-limiting examples, it being understood that these examples are intended to be illustrative only and that the invention is not intended to be limited to the materials, conditions, process parameters and the like recited therein.

EXAMPLE 1

Nickel Belts with a Chromium Plated Surface
—Using One Nickel Bath and One Chromium Bath—

NICKEL BATH:
Major Electrolyte Constituents:

Nickel Sulfamate—as $Ni^{+2}$, 11.5 oz/gal. (86.25 g/L)
Chloride—as $NiCl_2.6H_2O$, 2.5 oz/gal. (18.75 g/L)
Boric acid—5.0-5.4 oz/gal. (37.5-0.5 g/L)
pH—3.95-4.05 at 23° C.
Surface Tension—at 60° C., 32-37 d/cm using sodium lauryl sulfate (about 0.00525 g/L).
Saccharin—30 mg/L, as sodium benzosulfimide dihydrate.
Impurities:
Azodisulfonate—5-7 mg/L.
Cobalt—0.09 g/L.
Copper—5 mg/L.
Iron—25 mg/L.
MBSA—(2-methyl benzene sulfonamide)—5-6 mg/L.
Sodium—0.1 g/L.
Sulfate—0.5 g/L.
Operating Parameters:
Agitation Rate—150 linear cm/sec cathode rotation and 100 L/min solution flow to the 400 L cell.
Cathode (Mandrel)—Current density, 24 ASD (amperes per square decimeter).
Ramp Rise—0 to operating amps in 60 sec.±5 sec.
Anode—Sulfur depolarized nickel.
Anode to Cathode Ratio—1.5:1.
Mandrel—20 cm diameter chromium plated aluminum.
Cathode (Mandrel)—Current density, 15.6 ASD (amps per square decimeter).
Ramp Rise—0 to operating amps in 1 sec.±0.5 sec.
Anode—Lead with tin at 8% by weight.
Anode to Cathode Ratio—2.5:1.
Mandrel—20 cm diameter chromium plated aluminum.

|  | 1ST RUN | 2ND RUN | 3RD RUN | 4TH RUN | 5TH RUN | 6TH RUN | 7TH RUN | 8TH RUN |
|---|---|---|---|---|---|---|---|---|
| TEMPERATURE °C. | 53 | 54 | 55 | 56 | 57 | 58 | 59 | 60 |
| DEPOSIT THICKNESS | 0.00127 mm for all runs. | | | | | | | |
| HARDNESS DPH V 25 g | 994 | 995 | 997 | 1000 | 1005 | 991 | 1003 | 1008 |

The first electroformed belt is prepared on a preheated (temperature of the first nickel bath) mandrel and is removed from the nickel bath at a rate of 180 cm/min. As soon as the mandrel with the first electroformed nickel belt reaches the traveling height (30 cm) above the nickel bath, the electroformed nickel belt is rinsed for 6 complete revolutions with rinse water at 53° C. and a flow rate of 3 L/min. The speed of rotation at this step is 750 linear cm/min. Care is taken to make sure that all traces of the nickel bath are removed from both the mandrel and the nickel belt and that the nickel belt surface remains wet with rinse water. The input temperature of the nickel bath is adjusted to 54° C.

The mandrel with the first nickel belt is then moved to a position over the chromium bath. The belt is kept wet during this time by continuing to rotate the composite mandrel with the first belt and rinsing with the 53° C. rinse water.

The flow of rinse water is then terminated and the first belt on the mandrel is immediately submerged in the chromium plating bath at a speed of 180 cm/min. The rotation is then increased to 320 linear cm/min while quickly applying 15.6 amperes per square decimeter. The mandrel with the first belt remains submerged for six minutes. The mandrel with the first nickel belt, which is now chromium plated, is then removed from

|  | 1ST RUN | 2ND RUN | 3RD RUN | 4TH RUN | 5TH RUN | 6TH RUN | 7TH RUN | 8TH RUN |
|---|---|---|---|---|---|---|---|---|
| TEMPERATURE °C. | 53 | 54 | 55 | 56 | 57 | 58 | 59 | 60 |
| DEPOSIT THICKNESS | 0.0762 mm for all runs. | | | | | | | |
| HARDNESS DPH V 25 g | 273 | 274 | 279 | 286 | 289 | 296 | 302 | 305 |

RINSE WATER:

Specific Resistance - 1.5 Meg Ohm - cm, at 25° C.

|  | 1ST RUN | 2ND RUN | 3RD RUN | 4TH RUN | 5TH RUN | 6TH RUN | 7TH RUN | 8TH RUN |
|---|---|---|---|---|---|---|---|---|
| TEMPERATURE °C. | 53 | 54 | 55 | 56 | 57 | 58 | 59 | 60 |

CHROMIUM BATH:
Major Electrolyte Constituents:
$CrO_3$—172 g/L
Fluoride—as $F^-$ 0.7 g/L
$SO_4^=$ —1.35 g/L
Impurities:
Copper—10 mg/L.
Iron—65 g/L.
Sodium—0.3 g/L.
Operating Parameters:
Agitation Rate—5 linear cm/sec cathode rotation and 60 L/min solution flow to the 800 L cell.

that bath at a rate of 180 cm/min after terminating the current. As soon as the mandrel with the first chromium plated electroformed nickel belt reaches the traveling height (30 cm) above the chromium bath, the chromium plated electroformed nickel belt is rinsed for 6 complete revolutions with rinse water at 54° C. and a flow rate of 3 L/min. The speed of rotation at this step is 750 linear cm/min. Care is taken to make sure that all traces of the chromium bath are removed from the mandrel, the associated equipment, and the chromium plated nickel belt, and that the chromium plated surface remains wet with rinse water. The input temperature of the chromium bath is adjusted to 54° C.

The mandrel with the first chromium plated nickel belt is then moved to a position over the nickel plating bath. The belt is kept wet during this time by continuing to rotate the composite mandrel with the first belt and rinsing with the 54° C. rinse water.

The flow of rinse water is then terminated and the first chromium plated belt on the mandrel is immediately submerged in the nickel plating bath at a speed of 180 cm/min. The temperature of the electroforming zone in this bath is 54° C. The rotation is increased, current is applied, and the second electroformed nickel belt is deposited during the next 16.5 minutes as described above.

This process is repeated eight times. At each step the temperature of the rinse water as well as the chromium electroplating zone and the nickel electroforming zone is increased by 1° C. After seven chromium plated nickel belts and one unplated nickel belt are obtained one on top of the other and given a final rinse, the eight belts and the mandrel are cooled to 5° C. in a water bath. Upon removal from this cold water, the belts are removed from the mandrel as a group and are free to move independently of each other.

Cathode (Mandrel)—Current density, 24 ASD (amperes per square decimeter).
Ramp Rise—0 to operating amps in 60 sec. ±5 sec.
Anode—Sulfur depolarized nickel.
Anode to Cathode Ratio—1.5:1.
Mandrel—20 cm diameter chromium plated aluminum.

|                        | 1ST RUN | 2ND RUN | 3RD RUN | 4TH RUN | 5TH RUN | 6TH RUN | 7TH RUN | 8TH RUN |
|------------------------|---------|---------|---------|---------|---------|---------|---------|---------|
| TEMPERATURE °C.        | 60      | 60      | 60      | 60      | 60      | 60      | 60      | 60      |
| DEPOSIT THICKNESS      | 0.0762 mm for all runs. |||||||||
| HARDNESS DPH V 25 g    | 250     | 256     | 254     | 255     | 253     | 251     | 257     | 254     |

RINSE WATER:

| Specific Resistance - 1.5 Meg Ohm - cm, at 25° C. |||||||||
|---|---|---|---|---|---|---|---|---|
|                  | 1ST RUN | 2ND RUN | 3RD RUN | 4TH RUN | 5TH RUN | 6TH RUN | 7TH RUN | 8TH RUN |
| TEMPERATURE °C.  | 40 | 40 | 40 | 40 | 40 | 40 | 40 | 40 |

COBALT BATH:
Major Electrolyte Constituents:
Cobalt Sulfamate—as $Co^{+2}$, 1 oz/gal. (7.5 g/L)
Nickel Sulfamate—as $Ni^{+2}$, 10 oz/gal. (75 g/L)
Chloride—as $NiCl_2 \cdot 6H_2O$, 5.5 oz/gal. (18.75 g/L)
Boric acid—5.0-5.4 oz/gal. (37.5-40.5 g/L)
pH—3.95-4.05 at 23° C.
Surface Tension—at 60° C., 32-37 d/cm using sodium lauryl sulfate (about 0.00525 g/L).
Impurities:
Azodisulfonate—5-10 mg/L.
Copper—6 mg/L.
Iron—17 g/L.
Sodium—0.11 g/L.
Sulfate—0.43 g/L.
Operating Parameters:
Agitation Rate—150 linear cm/sec cathode rotation and 60 L/min solution flow to the 800 L cell.
Cathode (Mandrel)—Current density, 24 ASD (amperes per square decimeter).
Ramp Rise—0 to operating amps in 60 sec. ±5 sec.
Anode—90% electrolytic nickel and 10% electrolytic cobalt
Anode to Cathode Ratio—1.5:1.
Mandrel—20 cm diameter chromium plated aluminum.

EXAMPLE 2

Nickel Belts Alternated with Cobalt Baths

—Using one Nickel Bath and One Cobalt Bath—

NICKEL BATH:
Major Electrolyte Constituents:
Nickel Sulfamate—as $Ni^{+2}$, 11.5 oz/gal. (86.25 g/L)
Chloride—as $NiCl_2 \cdot 6H_2O$, 2.5 oz/gal. (18.75 g/L)
Boric acid—5.0-5.4 oz/gal. (37.5-40.5 g/L)
pH—3.95-4.05 at 23° C.

|                        | 1ST RUN | 2ND RUN | 3RD RUN | 4TH RUN | 5TH RUN | 6TH RUN | 7TH RUN | 8TH RUN |
|------------------------|---------|---------|---------|---------|---------|---------|---------|---------|
| TEMPERATURE °C.        | 60      | 60      | 60      | 60      | 60      | 60      | 60      | 60      |
| DEPOSIT THICKNESS      | 0.00127 mm for all runs. |||||||||
| HARDNESS DPH V 25 g    | 524     | 543     | 534     | 530     | 538     | 534     | 529     | 537     |

Surface Tension—at 60°C., 32-37 d/cm using sodium lauryl sulfate (about 0.00525 g/L).
Impurities:
Azodisulfonate—5-10 mg/L.
Cobalt—0.13 g/L.
Copper—7 mg/L.
Iron—25 mg/L.
Sodium—0.16 g/L.
Sulfate—0.52 g/L.
Operating Parameters:
Agitation Rate—150 linear cm/sec cathode rotation and 60 L/min solution flow to the 800 L The first electroformed belt is prepared on a preheated (temperature of the nickel bath) mandrel, and is removed from the nickel bath at a rate of 180 cm/min. As soon as the mandrel with the first electroformed nickel belt reaches the traveling height (30 cm) above the nickel bath, the electroformed nickel belt is rinsed for 6 complete revolutions with rinse water at 40° C. and a flow rate of 3 L/min. The speed of rotation at this step is 750 linear cm/min. Care is taken to make sure that all traces of the nickel bath are removed from both the mandrel and the nickel belt, and that the nickel belt surface remains wet with rinse water during this rinse.

The mandrel with the first nickel belt is then removed to a position over the cobalt electroforming bath. The belt is allowed to dry during the time between baths, by hanging the device in air between the two tanks for 100 seconds.

The first belt on the mandrel is then submerged in the cobalt electroforming bath at a speed of 108 cm/min. The rotation is 150 linear cm/sec, while 24 amperes per square decimeter is applied. The mandrel with the first belt remains submerged for 16.5 minutes. The mandrel with the first nickel belt, now encased in a cobalt belt, is removed from that bath at a rate of 180 cm/min after terminating the current. As soon as the mandrel with the first nickel belt and the first electroformed cobalt belt reaches the traveling height (30 cm) above the cobalt bath, the composite device is rinsed for 6 complete revolutions with rinse water at 40° C. and a flow rate of 3 L/min. The speed of rotation at this step is 750 linear cm/min. Care is taken to make sure that all traces of the cobalt bath are removed from the mandrel, the associated equipment, and the belts.

The mandrel with the first two belts, one nickel and the next cobalt, is then moved to a position over the nickel electroforming bath. The belt is allowed to dry during the time between baths, by hanging the device in air between the two tanks for 100 seconds.

This process is repeated until four nickel belts and four cobalt belts are obtained, one on top of the other in alternating layers.

After the eight belts are obtained one on top of the other and given a final rinse, the eight belts and the mandrel are cooled to 5° C. in a water bath. Upon removal from this cold water, the belts are removed from the mandrel as a group and are free to move independently of each other.

Other modifications of the present invention may occur to those skilled in the art subsequent to a review of the present application, and these modifications, including equivalents thereof, are intended to be included within the scope of the present invention.

What is claimed is:

1. An endless metal belt assembly, comprising:
a first belt surrounding a second belt, wherein
an inner surface of said first belt is comprised of a first metal;
an outer surface of said second belt is comprised of a second metal; and
a difference in hardness of said first metal and said second metal is at least about 100 DPH V 25 g.

2. The belt assembly of claim 1, further comprising a plurality of additional belts, wherein the outer surface of each said belt has a different hardness than the inner surface of each said belt.

3. The belt assembly of claim 1, wherein the flexible belt assembly is comprised of a plurality of belts wherein each belt has a hardness which is different than the hardness of any adjacent belt.

4. The belt assembly of claim 1, wherein the difference in hardness is from about 100 to about 800 DPH V 25 g.

5. The belt assembly of claim 4, wherein the difference in hardness is from about 150 to about 750 DPH V 25 g.

6. The belt assembly of claim 5, wherein the difference in hardness is from about 200 to about 600 DPH V 25 g.

7. The belt assembly of claim 1, wherein the first metal is nickel or a nickel alloy.

8. The belt assembly of claim 1, wherein the second metal is selected from the group consisting of chromium, a chromium alloy, cobalt and a cobalt alloy.

9. The belt assembly of claim wherein the first metal is nickel or a nickel alloy and the second metal is selected from the group consisting of chromium, a chromium alloy, cobalt and a cobalt alloy.

10. A flexible belt assembly, comprising:
a first belt surrounding a second belt, wherein
the outer surface of said second belt is comprised of a metal selected from the group consisting of chromium and cobalt; and
the inner surface of said first belt is comprised of a different metal.

11. The flexible belt assembly of claim 10, further comprising a gap between said surfaces ranging from about 0.0000254 mm to about 0.0762 mm.

12. The flexible belt assembly of claim 11, wherein said gap between said surfaces ranges from about 0.00762 mm to 0.0127 mm.

13. The flexible belt assembly of claim 10, wherein said different metal comprises nickel, copper, iron, tin, gold, silver, platinum, lead, palladium, or alloys thereof.

14. A process for preparing a flexible belt assembly, comprising:
forming a first belt with an outer surface comprised of a first metal; and
surrounding said first belt with a second belt with an inner surface comprised of a second metal;
wherein a difference in hardness of said first metal and said second metal is at least about 100 DPH V 25 g.

15. The process of claim 14, further comprising forming at least one additional belt surrounding said second belt,
wherein each surface of each additional belt is formed of a metal which has a different hardness than any adjacent belt surface.

16. The process of claim 14, wherein the difference of hardness is from about 100 to about 800 DPH V 25 g.

17. The process of claim 14, wherein the difference of hardness is from about 150 to 750 DPH V 25 g.

18. The process of claim 14, wherein the difference of hardness is from about 200 to 600 DPH V 25 g.

19. The process of claim 14, wherein the first metal is nickel or a nickel alloy.

20. The process of claim 14, wherein the first metal is nickel or a nickel alloy and the second metal is selected from the group consisting of chromium, a chromium alloy, cobalt and a cobalt alloy.

21. The process of claim 14, wherein the second metal is selected from the group consisting of chromium, a chromium alloy, cobalt and a cobalt alloy.

22. The process of claim 14, wherein the metal belts are formed by an electroforming process.

23. An electroforming process for preparing a flexible belt assembly, comprising:
electroforming a first belt with an outer surface comprised of a first metal;
surrounding said first belt with an electroformed second belt with an inner surface comprised of a second metal;
wherein a difference in hardness of said metal and said second metal is at least about 100 DPH V 25 g.

24. The process of claim 23, further comprising electroforming a plurality of additional belts to form the flexible belt assembly, wherein the hardness of each surface of a belt in the belt assembly is different than the hardness of any adjacent belt surface.

25. The process of claim 23, wherein the electroforming process comprises:
submerging a mandrel in an electroforming bath;
electroforming said first belt on said mandrel;
removing said first belt from the mandrel;
electroforming said second belt on said mandrel; and
assembling the belts to form the flexible belt assembly.

26. The process of claim 23, wherein the electroforming process comprises:
submerging a mandrel in an electroforming bath;
electroforming said first belt on said mandrel;
electroforming said second belt on said first belt while said first belt remains on said mandrel;
removing all said belts from said mandrel when the belt assembly is complete.

27. The process of claim 23, wherein the difference of hardness is from about 100 to about 800 DPH V 25 g.

28. The process of claim 23, wherein the difference of hardness is from about 150 to about 750 DPH V 25 g.

29. The process of claim 23, wherein the difference of hardness is from about 200 to about 600 DPH V 25 g.

* * * * *